Nov. 22, 1938.   L. J.-B. FORBES   2,137,472
MOLD FOR THE MANUFACTURE OF ARTICLES OF GLASS
IN COMBINATION WITH PLASTIC MATERIALS
Original Filed Feb. 5, 1936
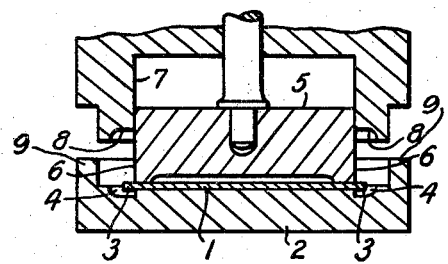
INVENTOR,
Lewis Jex-Blake Forbes
By Morrison, Kennedy &
Campbell, Attorneys.

Patented Nov. 22, 1938

2,137,472

UNITED STATES PATENT OFFICE 2,137,472

MOLD FOR THE MANUFACTURE OF ARTICLES OF GLASS IN COMBINATION WITH PLASTIC MATERIALS

Lewis Jex-Blake Forbes, St. Helens, England, assignor to Pilkington Brothers Limited, Liverpool, England, a company registered under the limited-liability acts Original application February 5, 1936, Serial No. 62,512. Divided and this application September 29, 1937, Serial No. 166,288. In Great Britain February 6, 1935

1 Claim. (Cl. 18—42)

This application is a division of my application Serial No. 62,512, filed February 5, 1936.

This invention has for its object the manufacture of articles composed of glass in combination with plastic materials requiring, generally, both heat and pressure for molding.

It has heretofore been found impracticable to manufacture commercially articles composed of glass in combination with plastic materials of the kind described, especially when the pressure required for molding the plastic material has to be applied in such a way that the glass is subjected in shearing or bending stress due to this pressure or any substantial component thereof.

For instance, if the article to be made is a tray composed of a sheet of glass embedded in a rim of plastic material such as that known under the registered trade-mark "Bakelite", the edge of the glass entering the mold for the rim is subjected to the heat which has to be supplied to the "Bakelite" powder and to a component of the pressure which has to be applied to mold it, and it has been found that the glass is broken in the molding process. The object of the present invention is to provide a mold adapted to mold plastic material about the edge of a glass plate or article.

Referring to the drawing which is a central vertical section of a mold, the sheet of glass 1, after being tempered, is laid on the surface of the first member 2, with its edge 3 protruding beyond the surface. The member W has a forming surface 4 below the protruding edge 3, and extending beyond it and, beyond the forming surface 4, an upstanding wall 9, extending above the upper surface of the glass. A second member 5 is pressed on to the upper surface of the glass 1, and the surface 6 of this second member forms, with the forming hollow 4 and the wall 9, a space sufficient to contain the whole of the molding powder and substantially larger than the volume of the finished molding. A third member 7, with forming surface 8, is then pressed into this space to mold the frame. In the case of plastic materials requiring heat in molding, the mold members are heated, and the glass sheet also is preferably heated before being placed in the mold.

It is advisable (and, in the case of thin glass, essential) that the horizontal space between the end of the glass sheet and the outer periphery of the hollow be wide enough to allow the plastic material to flow easily from the upper to the lower side of the overhanging edge of the sheet, because then the pressure exerted by the plunger in molding is partly transmitted to the underside of the overhanging edge, and is not wholly exerted as a downward bending moment on the edge. By this method I have successfully molded a rim of "Bakelite" on to the edge of a sheet of glass $\frac{3}{16}$ inch thick, employing a molding pressure of about 1 ton per square inch and a temperature of about 170 degrees centigrade.

The process is applicable to glass articles such, for example, as dishes, provided that their form is such that they can be pressed between two parts of the mold which form the inner edges of the rim to be molded, or pressed by one part of the mold on to an independently molded portion of the rim.

Having described my invention, I declare that what I claim and desire to secure by Letters Patent is:—

A mold for molding a frame of plastic material embracing the edge of a tempered glass article and round its periphery, comprising a first member having a first surface on which the article is adapted to rest with its edge protruding beyond the surface, a second and forming surface consisting of a hollow below the protruding edge and extending beyond it, and an upstanding wall beyond the second surface and extending above the upper surface of the glass, a second member adapted to press the glass on to the first surface of the first member and forming with the first member a space sufficient to contain the whole quantity of molding powder and substantially larger than the volume of the finished molding, and a third member adapted to enter the space between the second member and the upstanding wall of the first member to compress the molding powder into the finished molding.

LEWIS JEX-BLAKE FORBES.